United States Patent
Morse et al.

(10) Patent No.: US 6,598,922 B2
(45) Date of Patent: Jul. 29, 2003

(54) PICKUP TRUCK BED EXTENDER APPARATUS

(76) Inventors: Charles H Morse, 25 Crescent Ave., Beverly, MA (US) 01915; Donald N. Halgren, 35 Gential St., Manchester, MA (US) 01444

( * ) Notice: Subject to any disclaimer, the term of this patent is extended or adjusted under 35 U.S.C. 154(b) by 0 days.

(21) Appl. No.: 10/156,571

(22) Filed: May 28, 2002

(65) Prior Publication Data

US 2002/0167186 A1 Nov. 14, 2002

Related U.S. Application Data

(63) Continuation-in-part of application No. 09/848,129, filed on May 3, 2001, now Pat. No. 6,394,524.

(51) Int. Cl.⁷ .............................. B62L 1/06; B62D 33/08
(52) U.S. Cl. ...................... 296/26.02; 296/3; 296/37.6; 296/26.09; 296/26.1
(58) Field of Search ........................... 296/26.02, 26.06, 296/26.11, 26.09, 56, 57.1, 37.6, 51, 26.08, 26.04, 26.1, 3; 224/405

(56) References Cited

U.S. PATENT DOCUMENTS

| | | | | |
|---|---|---|---|---|
| 4,475,760 A | * | 10/1984 | Morgan | 296/26.09 |
| 5,037,152 A | * | 8/1991 | Hendricks | 296/26.06 |
| 5,147,103 A | * | 9/1992 | Ducote | 296/37.6 |
| 5,522,685 A | * | 6/1996 | Lessard | 410/121 |
| 5,700,047 A | * | 12/1997 | Leitner et al. | 296/37.6 |
| 5,816,637 A | * | 10/1998 | Adams et al. | 296/26.09 |
| 5,820,190 A | * | 10/1998 | Benner | 296/26.09 |
| 5,911,464 A | * | 6/1999 | White | 296/26.11 |
| 6,113,173 A | * | 9/2000 | Leitner et al. | 296/26.11 |
| 6,283,525 B1 | * | 9/2001 | Morse | 296/26.02 |
| 6,394,524 B1 | * | 5/2002 | Morse | 296/26.02 |

* cited by examiner

Primary Examiner—D. Glenn Dayoan
Assistant Examiner—Greg Blankenship
(74) Attorney, Agent, or Firm—Don Halgren

(57) ABSTRACT

A rack apparatus for improving the cargo carrying capacity of a pickup truck. The truck has a cab portion, a bed portion defined by a floor surface, a pair of sidewalls and a forward wall. The rack apparatus comprises a U-shaped frame having a pair of parallel side arms with a first and a second end, a cross bar attached to the first end of the arms, the U-shaped frame movable to and from a stowed-away position at a front end of the bed to a rearward position; the arms attached to the side walls of the pickup truck.

9 Claims, 6 Drawing Sheets

PICKUP TRUCK BED EXTENDER APPARATUS

This is a continuation-in-part application of my co-pending U.S. patent application Ser. No. 09/848,129, filed May 3, 2001, now U.S. Pat. No. 6,394,524, and is incorporated herein by reference in its entirety.

BACKGROUND OF THE INVENTION

1. Field of the Invention

The present invention relates to an apparatus for increasing the load carrying capacity of pickup trucks, and particularly to an articulable frame arrangement for increasing that load carrying capacity of a pickup truck.

2. Prior Art

About one in four of every vehicles on the road in the United States today is a pickup truck. Those pickup trucks are often utilized as both a family vehicle and as a utilitarian vehicle for home owners and service personnel. Theirs is often a dual function vehicle.

An attempt at dual function use of a pickup truck is shown by a truck rack adapter called the Rail 'N Rack System™ which permits a conversion of pickup truck bed rails into a rack. It becomes an overhead rack from a pair of bed rails. The bed rails, however, appear to require a supplemental crossbar attachment inasmuch as they are hinged at the rearwardmost point of the truck bed to provide the rear rack assembly. This is somewhat complicated. If the cross bar on the rack were constantly maintained on the side rails, they would take up valuable cargo space when the rack was not in its full upright orientation.

It is an object of the present invention to overcome the disadvantages of the prior art.

It is a further object of the present invention to provide a pickup truck with a simple, efficient, stowable rack arrangement which is not in the way of the cargo bed when the rack is not in its extended orientation but in its "stowed" orientation.

It is a yet further object of the present invention to provide a pickup truck rack arrangement that is simple to set up and which rack arrangement takes up minimum space and is unobtrusive within the cargo bed or on the side rails of the pickup truck.

BRIEF SUMMARY OF THE INVENTION

The present invention relates to a bed extender arrangement for a pickup truck. The pickup truck comprises a cab and a cargo bed thereadjacent. The cargo bed comprises an elongated floor defined by an arrangement of first and second parallel side walls, a front end wall, and a hinged tailgate extending off of the rear edge of the floor.

The bed extender arrangement in a first embodiment, comprises a generally U-shaped rail having a first side arm and a second side arm. Each side arm has a first end which is hingedly attached to an upper portion of the sidewall of the bed of the pickup truck. Each sidearm has a second end with a crossbar extending thereacross.

The U-shaped rail in the first embodiment, may be arranged so that its pair of side arms preferably rest upon or adjacent the upper edge of the sidewall at the forward half end of the bed of the pickup truck. The crossbar is thus stowed adjacent the rear wall of the cab. When it is desired to utilize the U-shaped rail to assist in cargo carrying capacity, the U-shaped rail is pivoted 180 degrees about it's hinges on the sidewall of the cargo bed, so that the crossbar and the side arms subsequently rest on the upper edge of the sidewall across a rear half portion of the bed of the pickup truck. In that manner, the crossbar provides a transverse support to long cargo such as ladders or pipes or timber.

In a further embodiment of the present invention, the side arms of the U-shaped rail are slidably disposed in a pair of tracks on the upper edge of the side wall of the bed of the pickup truck. Thus, the crossbar may be extended rearwardly over the tailgate and beyond the rear end of the sidewalls of that pickup truck.

In yet a further preferred embodiment of the present invention, a plurality of spaced-apart anchor points may be located on the upper edge of the sidewall. The side arms in this embodiment have a pin which mates into the anchor points and thus may be movably attachable to any one of those anchor positions spaced along the top of the sidewall to provide movability of the U-shaped rail either forwardly or rearwardly. This will enable that crossbar to be disposed at any location from the forward end of the pickup truck bed to beyond the rear end of the sidewalls and above a folded down tailgate, if desired, depending upon the orientation of the U-shaped rail is directed forwardly or rearwardly.

The crossbar in this embodiment may also be defined by a panel to function as a wall that may be disposed across (between) the sidewalls or beyond the rear edge of the sidewalls of the pickup truck bed. Thus that wall would function as a divider for cargo within the pickup truck bed or it would function as a rearwardmost wall, resting upon the tailgate in its folded down orientation.

That rearward wall in yet a further preferred embodiment may be attached to an extension of each sidearm, so as to hingedly extend therefrom to act as a ramp from the tailgate assembly.

The invention thus comprises a rack apparatus for improving the cargo carrying capacity of a pickup truck, said truck having a cab portion, a bed portion defined by a floor surface, a pair of sidewalls, a forward wall, said apparatus comprising: a U-shaped frame having a pair of parallel side arms with a first and a second end, a cross bar attached to said first end of the arms, the U-shaped frame movable to and from a stowed-away position at a front end of the bed to a rearward position; said arms attached to said side walls of the pickup truck. The side arms may be slidable on the side walls of the truck. The side arms may be telescopable to permit the side arms to be lengthwise adjustable. The cross bar may comprise a panel arranged perpendicular to the side arms. The side walls of the truck may have anchor points thereon to permit adjustment of position of the U-shaped frame with respect to the bed. The cross bar may be secured to the arms by a pair of exchangable connectors.

The invention may also include a method of improving the cargo carrying capacity of a pickup truck, comprising one or more of the following steps: arranging a generally U-shaped rack assembly having a pair of parallel side arms, on a forward end of a bed of the truck, the rack being secured to the truck by the side arms; moving the rack assembly from the forward end of the bed to a location rearward of the forward end of the bed; locating the rack to a position over a tailgate of the truck; telescoping the side arms to effect a change in length thereof; arranging a plurality of anchors on the side walls of the truck to permit the side arms of the rack to be moved from one anchor position to a second anchor position and pivoting the rack on a pair of hinge points from a forward position to a rearward position.

BRIEF DESCRIPTION OF THE DRAWINGS

The objects and advantages of the present invention will become more apparent when viewed in conjunction with the following drawings, in which.

DETAILED DESCRIPTION OF THE PREFERRED EMBODIMENTS

Figure 1:
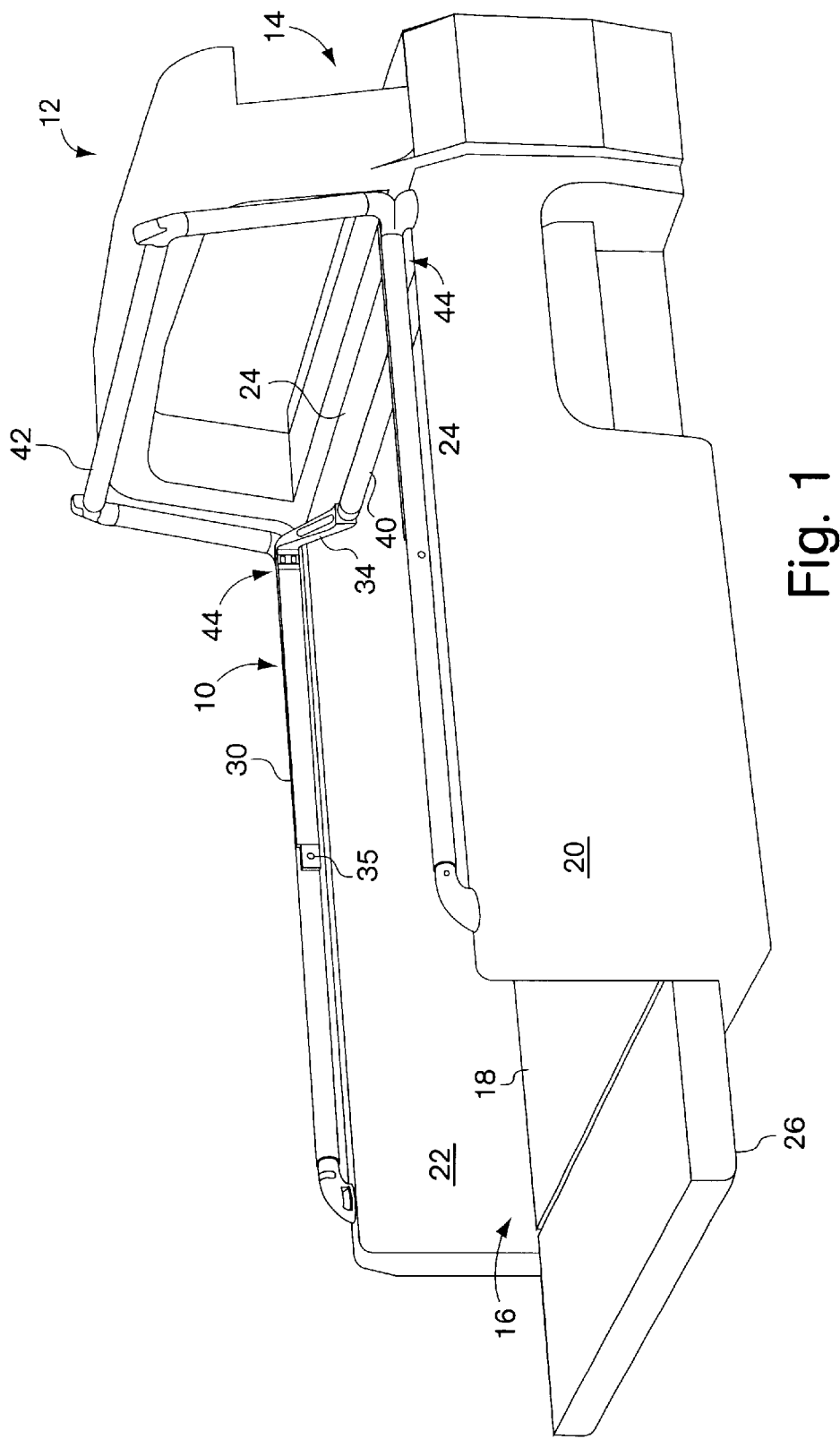
FIG. 1 is a perspective view of a portion of a cab and bed assembly of a pickup truck with the bed extender apparatus arranged in a stowed-forward orientation thereon.

Referring now to the drawings in detail, and particularly to FIG. 1, there is shown the present invention which comprises a bed extender arrangement 10 for a pickup truck 12. The pickup truck 12 comprises a cab 14 (only a portion shown for clarity) and a cargo bed 16 thereadjacent. The cargo bed 16 comprises an elongated floor 18 defined by an arrangement of first and second parallel side walls 20 and 22, a front end wall 24, and a hinged tailgate 26 extending off of the rear edge of the floor 18.

Figure 2:
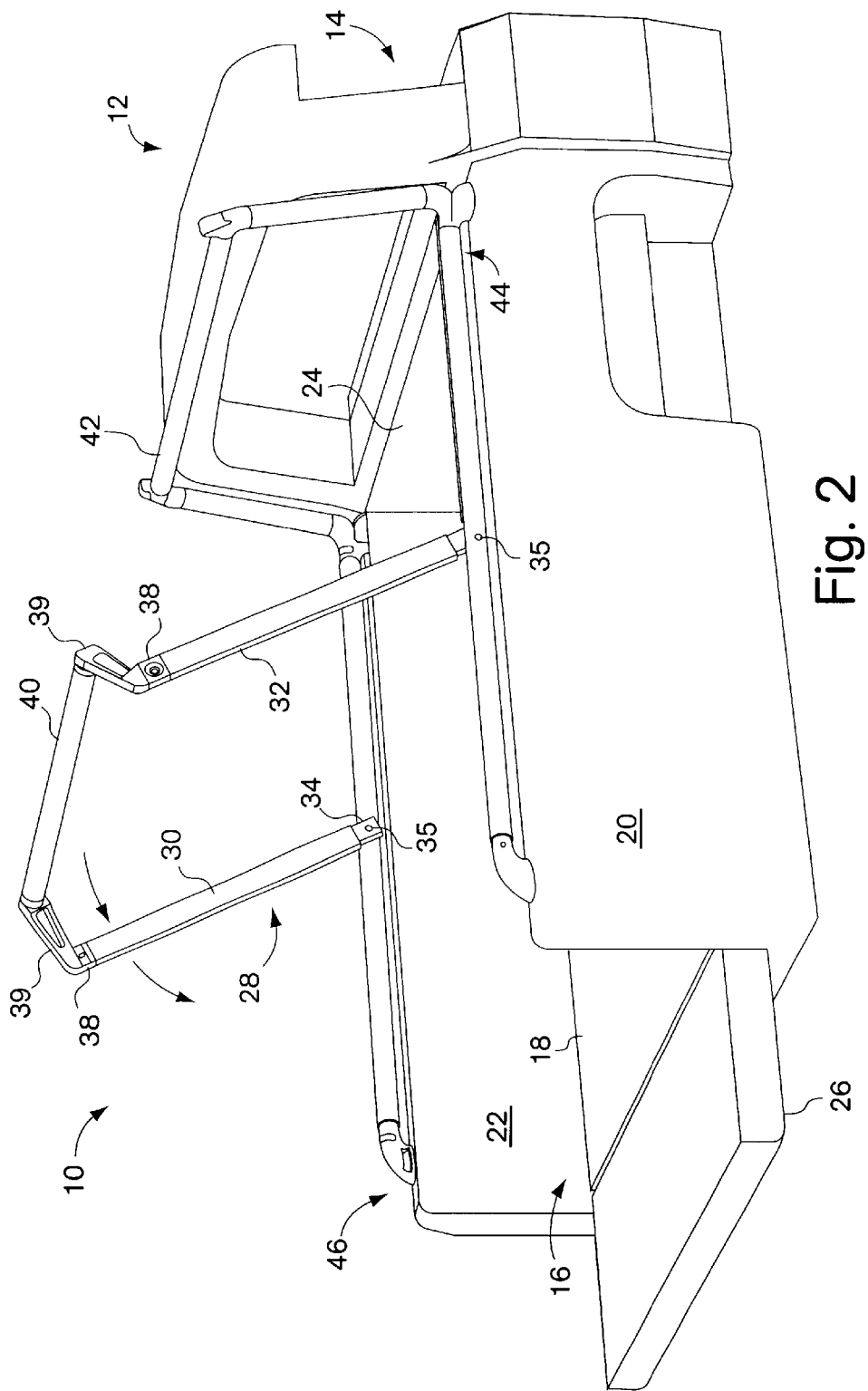
FIG. 2 is a view similar to FIG. 1 showing the bed extender apparatus in a pivoted orientation midway from the forward to rearward position.
Figure 3:
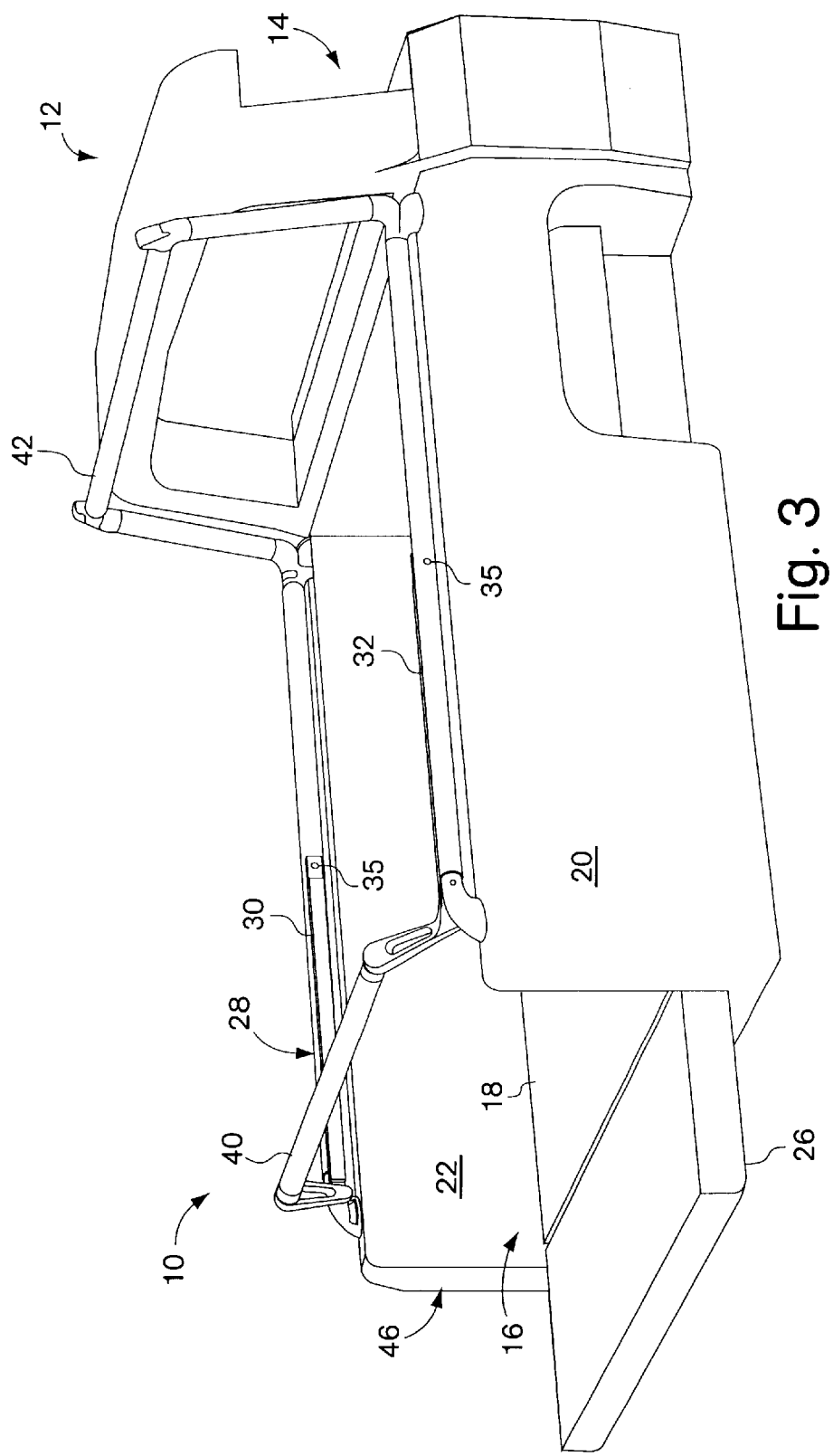
FIG. 3 is a view similar to FIG. 1 showing the bed extender apparatus in a rearward disposition.

The bed extender arrangement 10 in a first embodiment, comprises a generally U-shaped rail 28, best shown in FIG. 2, having a first side arm 30 and a second side arm 32. Each side arm 30 and 32 has a first end 34 which are attached by a hinge arrangement 35 to an upper portion 36 respectively of the sidewalls 22 and 24 of the bed 16 of the pickup truck 12. Each side arm 32 and 34 has a second end 38 with a crossbar 40 extending thereacross. A stationary U-shaped support frame 42 may be secured to the front wall 24 of the bed 16, as shown in FIGS. 1–3.

Figure 4:
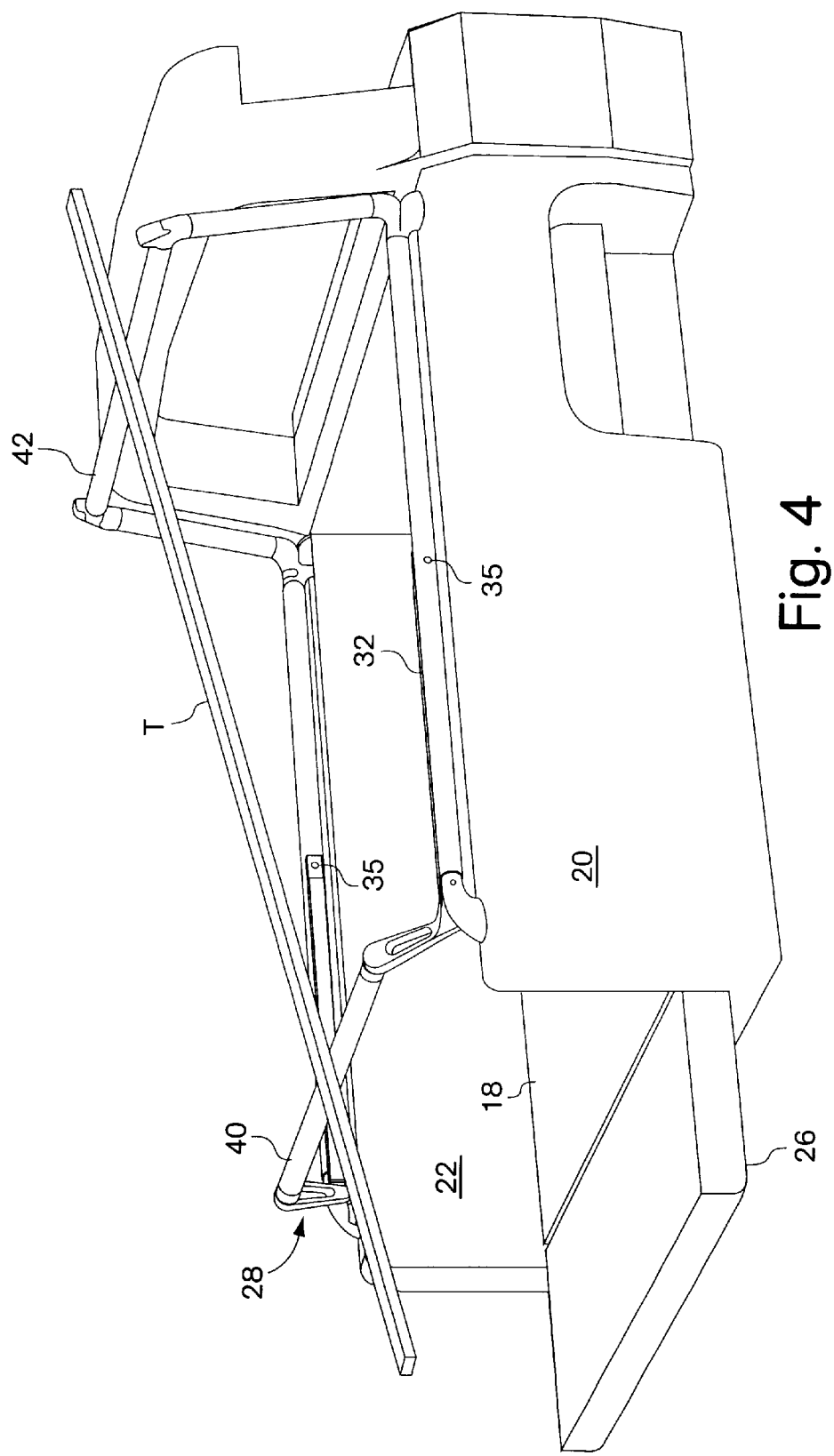
FIG. 4 is a view similar to FIG. 3 showing the bed extender apparatus carrying some elongated cargo.
Figure 5:
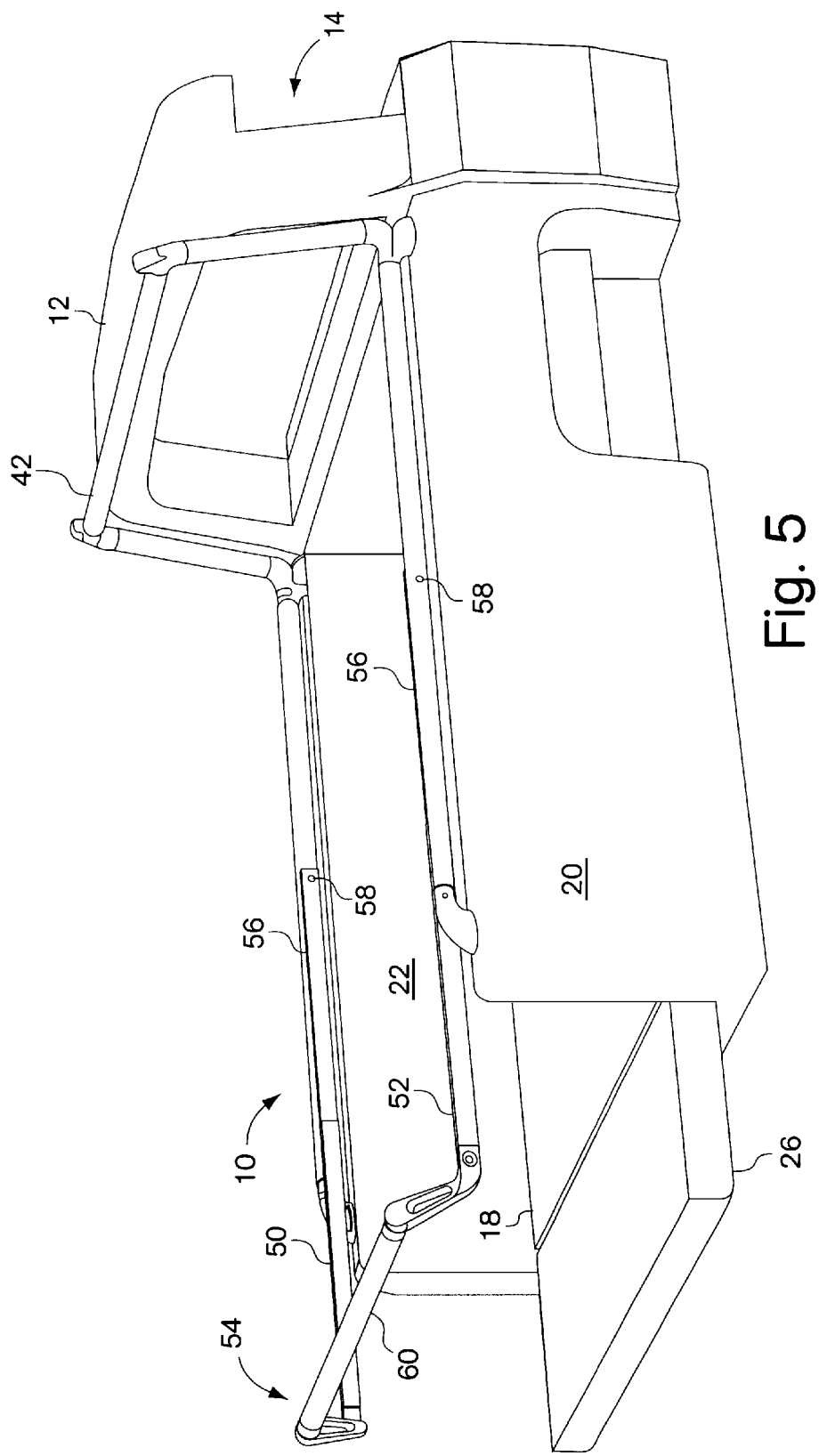
FIG. 5 is a view similar to FIG. 4 showing the bed extender apparatus in an elongated and telescoping orientation.

The U-shaped rail 28 in the first embodiment, may be arranged so that its pair of side arms preferably rest upon or adjacent the upper edge of the sidewall at the forward half end 44 of the bed 16 of the pickup truck 12. The crossbar 40 is thus stowed adjacent the rear wall of the cab 14, as shown in FIG. 1. When it is desired to utilize the U-shaped rail 28 to assist in cargo carrying capacity, the U-shaped rail 28 is pivoted 180 degrees (as shown in FIG. 2) about it's hinges 35 on the sidewall 22 and 24 of the cargo bed 16, so that the crossbar 40 and the side arms 30 and 32 subsequently rest on the upper edge of the sidewall across a rear half portion 46 of the bed 16 of the pickup truck 12. In that manner, the crossbar 40 provides a transverse support to long cargo such as ladders or pipes or timber "T" as shown in FIG. 4. A pair of connectors 39 connect the cross bar 40 to the ends of the side arms 30 and 32. The connectors 39 may be removable so as to permit longer connectors to be substituted therefor, to effect a higher support rail (cross bar 40) over the tailgate 26.

In a further embodiment of the present invention, an arrangement of side arms 50 and 52 of the U-shaped rail 54 are slidably disposed in a pair of tracks 56 on the upper edge of the side walls 22 and 24 of the bed 16 of the pickup truck 12. The tracks 56 are attached to a hinge 58 which is attached to an upper edge of the side walls 22 and 24. Thus, the crossbar 60 may be extended rearwardly over the tailgate 26 and beyond the rear end of the side walls 22 and 24 of that pickup truck 12.

Figure 6:
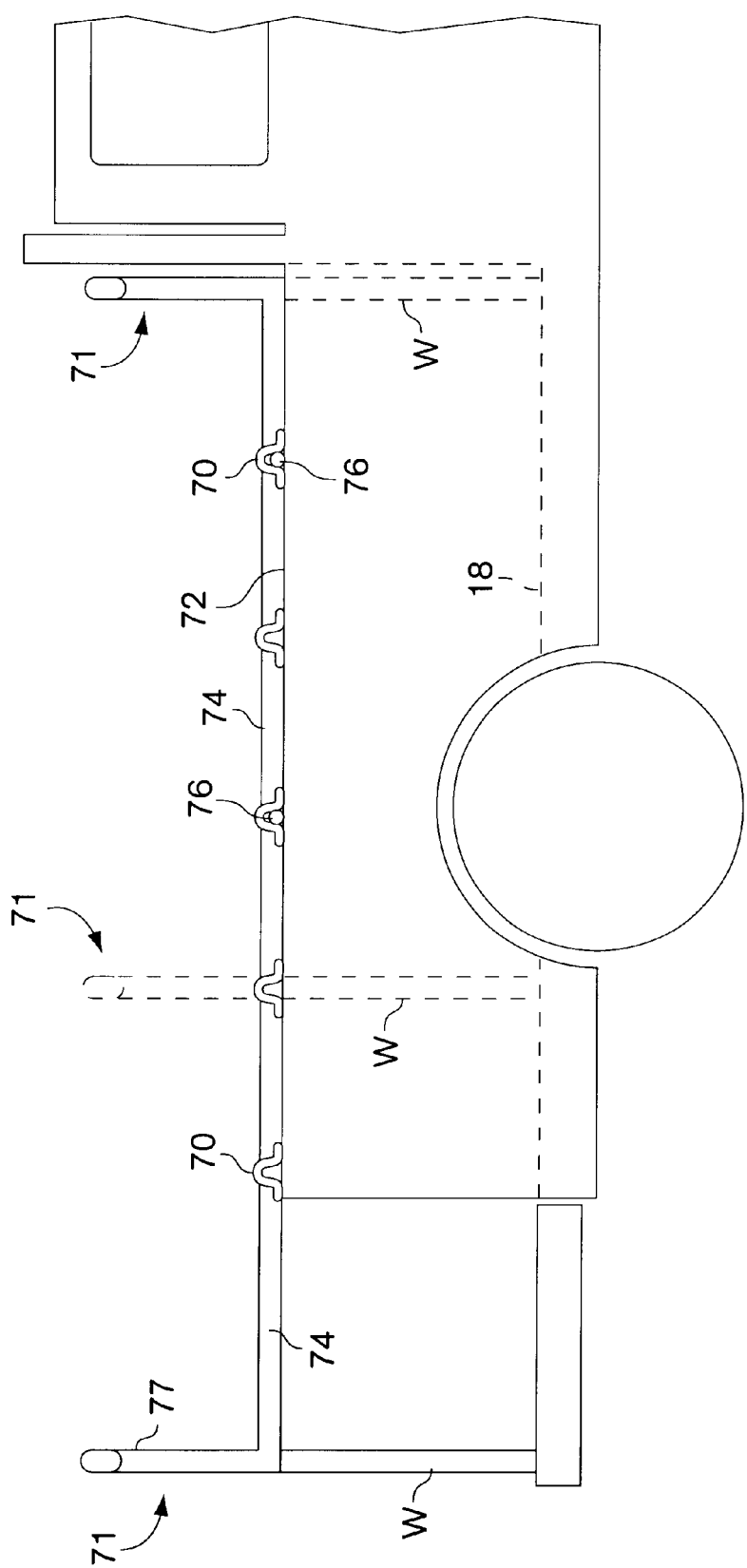
FIG. 6 is a side elevational view of a pickup truck with a bed divider apparatus shown therewith.

In yet a further preferred embodiment of the present invention, a plurality of spaced-apart anchor points 70 may be located on the upper edge 72 of the sidewalls 22 and 24, as shown in FIG. 6. The extender 71 is of "T" shape in side elevation in this embodiment and has a pair of side arms 74 with their distalmost ends each having a pin 76 which mates into the anchor points 70. This permits the extender 71 to be moved anywhere along the edge of the sidewalls 22 and 24 and thus may be movably attachable to any one of those anchor points 70 spaced along the top of the sidewall to provide movability (of the U-shaped rail either forwardly or rearwardly. A mid-bed location is shown in phantom in FIG. 6. This will enable that crossbar 77 to be disposed at any location from the forward end of the pickup truck bed to beyond the rear end of the sidewalls and above a folded down tailgate, if desired, depending upon the orientation of the extender 71 is directed forwardly or rearwardly.

The crossbar 77 in this embodiment may also be defined by a panel to function as a wall "W" that may be disposed across (between) the side walls 22 and 24 or beyond the rear edge of the side walls 22 and 24 of the pickup truck bed 16. Thus that wall "W" would function either as a divider (as shown in phantom) for cargo within the pickup truck bed or it would function as a rearwardmost wall, resting upon the tailgate in its folded down orientation, as shown to the left in FIG. 6.

That rearward wall in yet a further preferred embodiment may be attached to an extension of each sidearm, so as to hingedly extend therefrom to act as a ramp from the tailgate assembly.

We claim:

1. A rack apparatus for improving the cargo carrying capacity of a pickup truck, said truck having a cab portion, a bed portion defined by a floor surface, a pair of sidewalls, a forward wall, said apparatus comprising:

a U-shaped frame having a pair of parallel side arms with a first and a second end, a cross bar attached to said first end of said arms, said U-shaped frame movable to and from a stowed-away position at a front end of said bed to a rearward position;

said arms attached to said side walls of said pickup truck, and said arms are slidable on said side walls.

2. The rack apparatus as recited in claim 1, wherein said side arms are telescopable to permit said side arms to be lengthwise adjustable.

3. The rack apparatus as recited in claim 1 wherein said cross bar comprises a panel arranged perpendicular to said side arms.

4. The rack apparatus as recited in claim 1, wherein said side walls of said truck have anchor points thereon to permit adjustment of position of said U-shaped frame with respect to said bed.

5. The rack apparatus as recited in claim 1, wherein said cross bar is secured to said arms by a pair of exchangable connectors.

6. A method of improving the cargo carrying capacity of a pickup truck, comprising:

arranging a generally U-shaped rack assembly having a pair of parallel side arms, on a forward end of a bed of said truck, said rack being secured to said truck by said side arms;

moving said rack assembly from said forward end of said bed to a location rearward of said forward end of said bed; and telescoping said side arms to effect a change in length thereof.

7. The method as recited in claim 6, including:

locating said rack to a position over a tailgate of said truck.

8. The method as recited in claim 6, including:

arranging a plurality of anchors on said side walls of said truck to permit said side arms of said rack to be moved from one anchor position to a second anchor position.

9. The method as recited in claim 6, including:

pivoting said rack on a pair of hinge points from a forward position to a rearward position.

* * * * *